(12) United States Patent  
Newton (10) Patent No.: US 7,935,238 B2  
(45) Date of Patent: May 3, 2011

(54) ELECTROMECHANICAL FILTER FOR FISCHER-TROPSCH SYNTHESIS

(75) Inventor: David Newton, Surrey (GB)

(73) Assignees: BP Exploration Operating Company, Middlesex (GB); Davy Process Technology Limited, London (GB)

( * ) Notice: Subject to any disclaimer, the term of this patent is extended or adjusted under 35 U.S.C. 154(b) by 1457 days.

(21) Appl. No.: 10/549,568

(22) PCT Filed: Mar. 18, 2004

(86) PCT No.: PCT/GB2004/001178  
§ 371 (c)(1),  
(2), (4) Date: Sep. 19, 2005

(87) PCT Pub. No.: WO2004/082825  
PCT Pub. Date: Sep. 30, 2004

(65) Prior Publication Data  
US 2006/0096854 A1      May 11, 2006

(30) Foreign Application Priority Data  
Mar. 19, 2003   (GB) .................................. 0306307.0

(51) Int. Cl.  
*B01J 19/08*   (2006.01)  
*C02F 1/46*   (2006.01)

(52) U.S. Cl. ........................................ 204/560; 204/562
(58) Field of Classification Search .......... 205/687–761; 204/560, 562  
See application file for complete search history.

(56) References Cited

U.S. PATENT DOCUMENTS

| 3,458,414 | A | * | 7/1969 | Crane et al. | 210/746 |
| 5,332,485 | A |   | 7/1994 | Thompson |  |
| 5,647,965 | A | * | 7/1997 | Crose et al. | 204/572 |
| 6,709,567 | B1 | * | 3/2004 | Sale et al. | 205/688 |

FOREIGN PATENT DOCUMENTS

| DE | 37 07 625 A1 | 12/1987 |
| FR | 1332820 | 7/1963 |
| WO | WO 95/30726 | 11/1995 |

* cited by examiner

*Primary Examiner* — Arun S Phasge  
(74) *Attorney, Agent, or Firm* — Nixon & Vanderhye (57) ABSTRACT

Electromechanical filtering unit having a conduit capable of conducting electricity, at least one first electrode connectable to a high voltage power supply (EHT) and at least one second electrode having a plurality of discrete openings which is earthed. The electrodes are positioned within the conduit and connected to the conduit such that electricity can pass between the electrodes via the conduit.

8 Claims, 5 Drawing Sheets

ELECTROMECHANICAL FILTER FOR FISCHER-TROPSCH SYNTHESIS

This application is the U.S. National Phase of International Application PCT/GB2004/001178, filed 18 Mar. 2004, which designated the U.S. PCT/GB2004/001178 claims priority to British Application No. 0306307.0 filed 19 Mar. 2003. The entire content of these applications are incorporated herein by reference.

The present invention relates to apparatus and a process for separating fine catalyst particles from a hydrocarbon medium and is particularly concerned with removing fine catalyst particles from a Fischer-Tropsch product stream.

BACKGROUND OF THE INVENTION

In the Fischer-Tropsch reaction a gaseous mixture of carbon monoxide and hydrogen (synthesis gas) is reacted in the presence of a heterogeneous catalyst to give a hydrocarbon mixture having a relatively broad molecular weight distribution. This product is predominantly straight chain, saturated hydrocarbons which typically have a chain length of more than 5 carbon atoms. The reaction is highly exothermic and therefore heat removal is one of the primary constraints of all Fischer-Tropsch processes. This has directed commercial processes away from fixed bed operation to slurry systems. Such slurry systems employ a suspension of catalyst particles in a liquid medium thereby allowing both the gross temperature control and the local temperature control (in the vicinity of individual catalyst particles) to be significantly improved compared with fixed bed operation.

Fischer-Tropsch processes are known which employ slurry bubble columns in which the catalyst is primarily distributed and suspended in the slurry by the energy imparted from the synthesis gas rising from the gas distribution means at the bottom of the slurry bubble column as described in, for example, U.S. Pat. No. 5,252,613.

The catalyst may also be used in suspension in a reactor comprising at least one high shear mixing zone and a reactor vessel such as the reactor system described in WO 0138269 which is herein incorporated by reference.

However these type of reactors suffer from the disadvantage that separation of the catalyst from the product needs to be employed on a continuous basis and this can be problematic.

Filtration systems are known which utilize either an internal filter in the main body of the reactor or an external filter in a recycle line or a product withdrawal line.

Other filtration systems include a reactor as described in WO 97/12118 with a section of its wall acting as a filter and relies on the turbulent nature of the fluids passing over it to prevent clogging.

Furthermore settling tanks which rely on gravity separation of the catalyst may also be used. However such settling tanks are undesirable for commercial operation because of the very large scale and number required.

Thus for commercial operation of a Fischer-Tropsch process it is essential to provide a continuous and reliable separation system for removing the catalyst from the liquid products such that the catalyst particles can be continuously returned to the reactor without deactivation.

SUMMARY OF THE INVENTION

Accordingly the present invention provides an electromechanical filtering unit comprising a conduit, preferably cylindrical, capable of conducting electricity, at least one first electrode connectable to a high voltage power supply (EHT) and at least one second electrode having a plurality of discrete openings which is earthed wherein the electrodes are positioned within the conduit and connected to the conduit such that electricity can pass between the electrodes via the conduit and, preferably, wherein the second electrode occupies the internal cross sectional area of the conduit.

Figure 5:
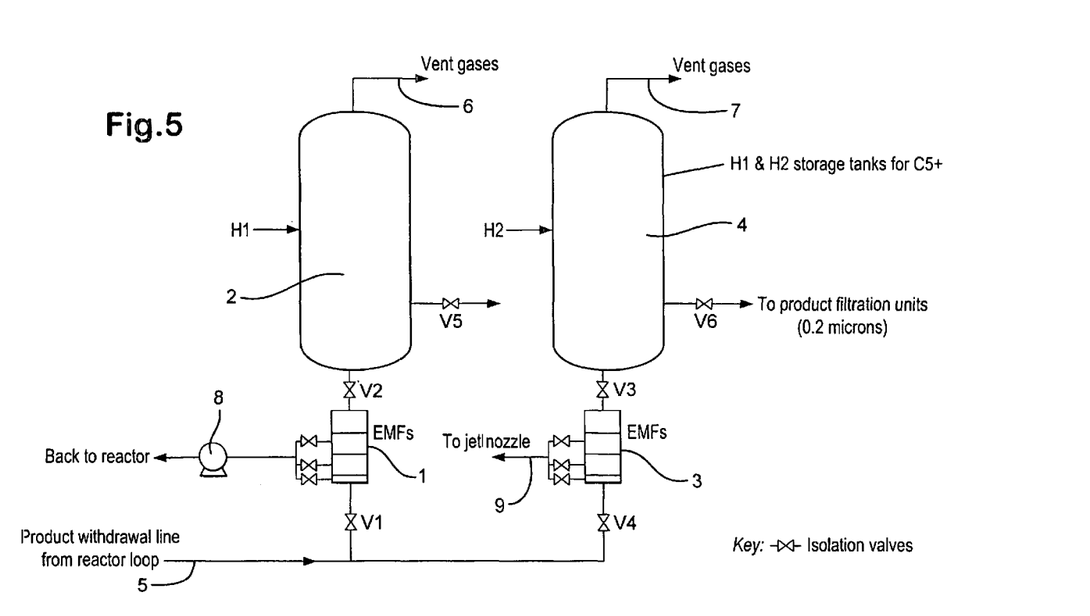
FIG. 5 shows a yet further electromechanical filtering unit arrangement.

The present invention also provides a filtering process wherein the electromechanical filtering unit is used to remove solid particles suspended in a liquid comprising passing a suspension through the conduit in a direction such that the first electrode is upstream of the second electrode with respect to the directional flow of the suspension and generating an electric field within the conduit by connecting the first electrode to the high voltage supply such that the solid particles attach themselves to the second electrode and a liquid with a reduced solids content passes through the conduit. By "attach themselves to the second electrode", it is to be understood that thanks to the electric field applied between the two electrodes, there is a high concentration of solid particles in between these two electrodes, high concentration of solid particles which can then easily be removed (continuously or batch) and recycled to the reactor (as shown in FIG. 5).

When the electric field is switched off the suspension of solid particles may continue to pass through electromechanical filtering unit.

Advantageously the electromechanical filtering unit may comprise a conduit and more than one first and second electrode pair e.g. at least two first and second electrode pairs and preferably at least three first and second electrode pairs. These electrode pairs are usually arranged in series within the conduit. Usually the electric field that is generated between each electrode pair varies in size. Usually the weakest electrical field is generated in the electrode pair which is positioned upstream with respect to the directional flow of the suspension such that the electrode pairs successively filter the solids from the suspension. In this preferred embodiment of the invention a controlled and gradual depletion of the solids can be achieved.

The magnitude of the electric field is dependant upon a number of features namely, the diameter of the conduit, the separation between the first and second electrode, the flow rate of the suspension, the electrical conductivity of the suspension, the content of solids in the suspension, the size of the particles suspended in the liquid, the density of the particles suspended in the liquid, the voltage supplied by the EHT and the size of the discrete openings in the second electrode.

One of the advantages of the present invention lies in the ability to easily control the solid particles filtration and recycle into the FT reactor. Indeed, as explained hereabove it is quite simple to properly control the electric field and consequently the way that the solid particles are "trapped" between the electrodes. As mentioned hereabove, an additional fine tuning of the filtration method is also possible thanks to the use of pair of electrodes in series, allowing an independent electric field control for each pair of electrode. Simultaneously, as shown on FIG. 5, the recycle of the solid particles is also quite simple and can be easily controlled by controlling the flow rate of the lateral extractions from the electromechanical filters. Indeed, according to the present invention one does not use the old "gravity" like technique for recovering the solid particles; according to a preferred embodiment of the present invention, the high content solid particles liquid is laterally withdrawn from the conduit and preferably directly recycled into the reactor.

The diameter of the conduit is usually between 0.1-10 m, preferably between 0.2-5 m and most preferably between 0.5-1.5 m e.g. 1 m. Wherein every other feature is kept constant reducing the diameter of the conduit increases the magnitude of the electric field.

The separation between the first and second electrode is usually between 0.5-50 mm, preferably between 1-20 mm and most preferably between 2-10 mm e.g. 5 mm. Wherein every other feature is kept constant reducing the separation between the first and second electrode increases the magnitude of the electric field.

The flow rate of the suspension is typically between 1-20 cm/s, preferably between 2-10 cm/s and most preferably between 3-8 cm/s e.g. 3.5-6 cm/s. Wherein every other feature is kept constant reducing the flow rate of the suspension also increases the magnitude of the electric field.

The size of the particles in the suspension is usually between 1-500 microns, preferably between 10-100 microns and most preferably between 20-50 microns e.g. 30 microns. Wherein every other feature is kept constant reducing size of the particles in the suspension again increases the magnitude of the electric field.

The voltage supplied by the EHT is usually between 1-2000 kV/m, preferably 5-1500 kV/m and most preferably between 10-1000 kV/m e.g. 500 kV/m with currents of between 2-2000 mA, preferably between 5-1000 mA and most preferably between 10-500 mA e.g. 200 mA. Wherein every other feature is kept constant increasing the voltage supplied by the EHT increases the magnitude of the electric field.

The second electrode may be in the form of a mesh, a grid or a gauze. Wherein every other feature is kept constant reducing the size of the discrete openings in the second electrode increases the magnitude of the electric field.

The first electrode may also occupy the internal cross sectional area of the conduit and the first electrode may also be in the form of a mesh, a grid or a gauze.

The size of the discrete openings in the second electrode and optionally the first electrode is usually in the range of from 0.5 mm to 50 mm, preferably in the range of from 5 to 10 mm. Typically the electrode comprise between 0.04 to 4 discrete openings per $cm^2$.

Figure 3:
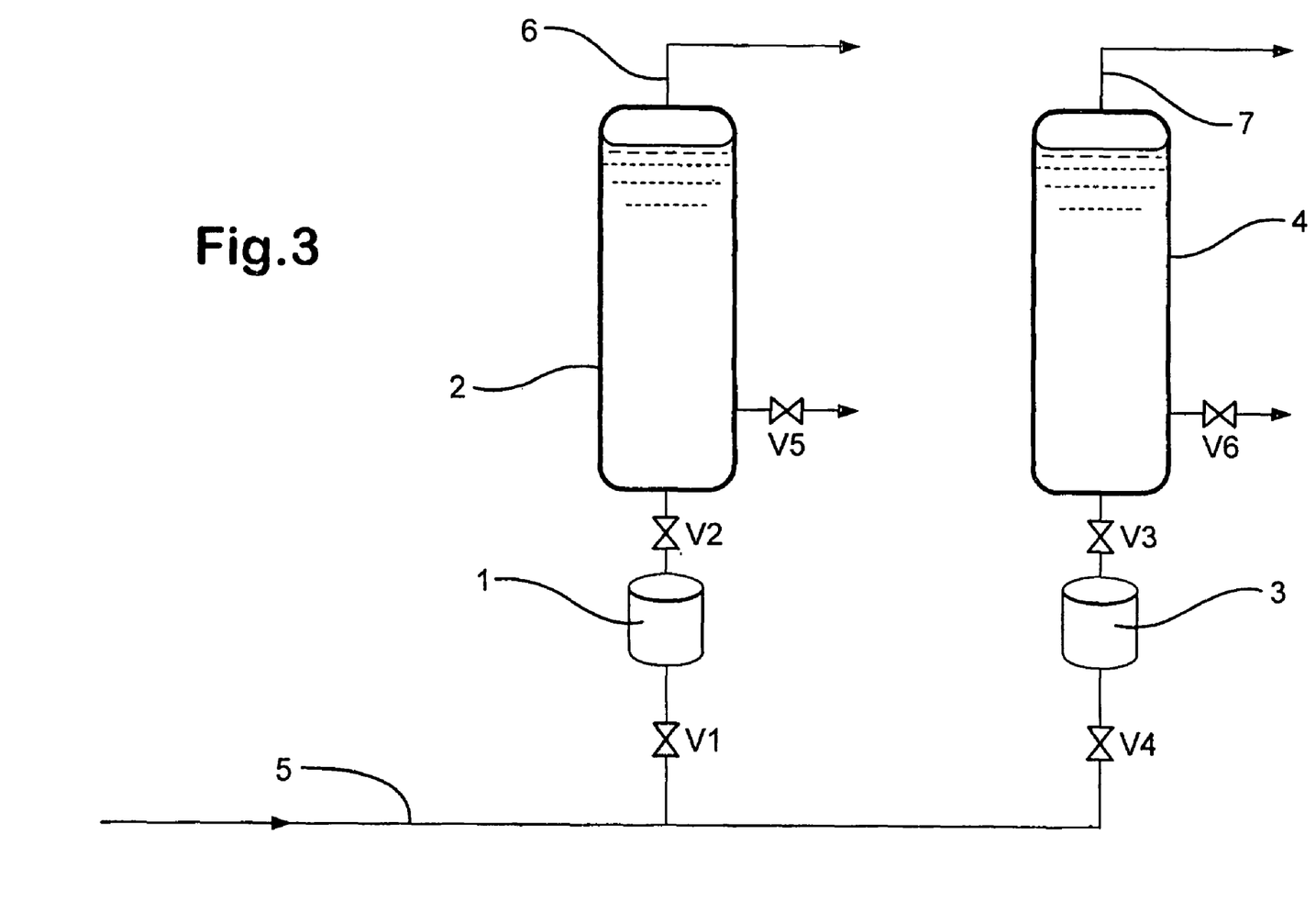
FIG. 3 shows a further electromechanical filtering unit arrangement.

The electromechanical filtration unit may further comprise an associated holding vessel connected to the downstream end of the conduit wherein the liquid with a reduced solids content can be advantageously retained, such as shown respectively in FIGS. 3 and 5.

The solid particles in the process of the present invention are usually catalyst particles and are preferably Fischer-Tropsch catalyst particles. The liquid is preferably a hydrocarbon liquid and most preferably is a liquid hydrocarbon stream comprising hydrocarbons having a chain length of more than 5 carbons atoms. In a preferred embodiment of the invention the solids are Fischer-Tropsch catalyst particles and the liquid is a Fischer-Tropsch product stream.

According the present invention also provides a Fischer-Tropsch process for the conversion of gaseous reactants to liquid hydrocarbon products comprising a) passing the gaseous reactants and a suspension comprising catalyst suspended in a liquid medium to a reaction zone b) converting at least a portion of the gaseous reactants to liquid hydrocarbon products to form a product suspension comprising catalyst suspended in the liquid medium and the liquid hydrocarbon products;

c) passing at least a portion of the product suspension through at least one electromechanical filtration unit wherein at least a portion of the catalyst is separated from the product suspension to provide a concentrated catalyst slurry and a product suspension with a reduced catalyst content.

Preferably the concentrated catalyst slurry is recycled back to the reaction zone.

In a preferred embodiment of the invention at least one electromechanical filtration unit may be used in conjunction with a Fischer-Tropsch reactor comprising at least one high shear mixing zone and a reactor vessel such as the reactor system described in WO 0138269.

Accordingly the present invention also provides a Fischer-Tropsch process for the conversion of gaseous reactants to liquid hydrocarbon products by contacting the gaseous reactants at an elevated temperature and pressure with a suspension comprising catalyst suspended in a liquid medium, in a system comprising a high shear mixing zone and a post mixing zone wherein the process comprises:

a) passing the suspension comprising catalyst suspended in the liquid medium through the high shear mixing zone where a gaseous reactant stream comprising the gaseous reactants is mixed with the suspension;

b) discharging a mixture comprising gaseous reactants and suspension from the high shear mixing zone into the post mixing zone;

c) converting at least a portion of the gaseous reactants to liquid hydrocarbon products in the post mixing zone to form a product suspension comprising catalyst suspended in the liquid medium and the liquid hydrocarbon products;

d) separating a gaseous stream comprising unconverted gaseous reactants from the product suspension;

e) recycling the separated gaseous stream to the high shear mixing zone f) passing at least a portion of the product suspension through at least one electromechanical filtration unit wherein at least a portion of the catalyst is separated from the product suspension to provide a concentrated catalyst slurry and a product suspension with a reduced catalyst content g) recycling the concentrated catalyst slurry catalyst to the system, preferably to the high shear mixing zone.

Wherein the Fischer-Tropsch process comprises a high shear mixing zone the high shear mixing zone may be part of the system inside or partially outside the post mixing zone, for example, the high shear mixing zone may project through the walls of the post mixing zone such that the high shear mixing zone discharges its contents into the post mixing zone. The system may comprise a plurality of high shear mixing zones, preferably up to 250 high shear mixing zones, more preferably less than 100, most preferably less than 50, for example 10 to 50 high shear mixing zones. Preferably, the plurality of high shear mixing zones discharge into a single post mixing zone which has an advantage of significantly reducing the size of a commercial Fischer-Tropsch plant. Preferably, the plurality of high shear mixing zones may be spaced uniformly inside or partially outside the post mixing zone, for example, the high shear mixing zones may be spaced uniformly at or near the top of the post mixing zone. Preferably, the high shear mixing zones discharge the mixture of gaseous reactants and suspension in a downwards direction into the post mixing zone.

The high shear mixing zone(s) may comprise any device suitable for intensive mixing or dispersing of a gaseous stream in a suspension of solids in a liquid medium, for example, a rotor-stator device or, preferably, an injector-mixing nozzle.

The gaseous stream comprising unconverted gaseous reactants may be separated from the product suspension either within the post mixing zone or in an external gas liquid separation zone. The separated gaseous stream may comprise vaporized low boiling liquid hydrocarbon products, vaporized water by-product and gaseous hydrocarbons having from 1 to 3 carbon atoms such as methane, ethane and propane, in addition to unconverted gaseous reactants.

Suitably, the post mixing zone comprises a vessel, for example, a tank reactor or a tubular loop conduit and the injector-mixing nozzle can be placed at any position on the walls of the vessel (for example, at the top, bottom or side walls of a tank reactor).

Preferably the product suspension from the Fischer-Tropsch process may be passed to at least two electromechanical filtration units e.g. at least three electromechanical filtration units.

The product suspension is usually passed to the electromechanical filter via a product suspension withdrawal line. In a preferred embodiment of the invention the product withdrawal line may constitute the conduit of the electromechanical filter.

Preferably the gaseous reactants comprise a mixture of carbon monoxide and hydrogen (synthesis gas). Preferably the ratio of hydrogen to carbon monoxide in the synthesis gas is 2:1 by volume.

Preferably the liquid hydrocarbon products comprise a mixture of hydrocarbons having a chain length of greater than 5 carbon atoms. Suitably the liquid hydrocarbon products comprise a mixture of hydrocarbons having chain lengths of from 5 to about 90 carbon atoms. Preferably a major amount, for example, greater than 60% by weight, of the hydrocarbons have chain lengths of from 5 to 30 carbon atoms.

Suitably the liquid medium comprises one or more of the liquid hydrocarbon products which has the advantage that there is no requirement to separate the liquid hydrocarbon products from the liquid medium.

The catalyst which may be employed in the process of the present invention is any catalyst known to be active in Fischer-Tropsch synthesis. For example, Group VIII metals whether supported or unsupported are known Fischer-Tropsch catalysts. Of these iron, cobalt and ruthenium are preferred, particularly iron and cobalt, most particularly cobalt.

A preferred catalyst is supported on an inorganic refractory oxide. Preferred supports include silica, alumina, silica-alumina, the Group IVB oxides, titania (primarily in the rutile form) and most preferably zinc oxide. Alternatively the support may be carbon. The supports generally have a surface area of less than about 100 m$^2$/g, preferably less than 50 m$^2$/g, more preferably less than 25 m$^2$/g, for example, about 5 m$^2$/g.

The catalytic metal is present in catalytically active amounts usually about 1-100 wt %, the upper limit being attained in the case of iron based catalysts, preferably 2-40 wt %. Promoters may be added to the catalyst and are well known in the Fischer-Tropsch catalyst art. Promoters can include ruthenium, platinum or palladium (when not the primary catalyst metal), rhenium, hafnium, cerium, lanthanum and zirconium, and are usually present in amounts less than the primary catalytic metal (except for ruthenium which may be present in coequal amounts), but the promoter:metal ratio should be at least 1:10. Preferred promoters are rhenium and hafnium.

The electrical conductivity of the suspension of catalyst in the Fischer-Tropsch product and water is usually in the range $10^{-5}$ to $10^2 \Omega^{-1}$ m$^{-1}$. The addition of other components may affect the electrical conductivity e.g. such as the addition of metal catalyst fines and catalyst additives.

Typically the hydrodynamic density of the catalyst particles is in the range 1000 kgm$^{-3}$ to 3700 kgm$^{-3}$. The particle bulk densities are usually in the range of 400 kgm$^{-3}$ to 2500 kgm$^{-3}$. Preferably the suspension usually comprises between 10 to 40 wt % by weight of catalyst.

The process of the invention is preferably carried out at a temperature of 180-400° C., more preferably 190-350° C.

The process of the invention is preferably carried out at a pressure of 5-50 bar, more preferably 15-35 bar, generally 20-30 bar.

BRIEF DESCRIPTION OF THE DRAWINGS

The present invention will now be illustrated with reference to the following figures, in which.

DETAILED DESCRIPTION OF PREFERRED EMBODIMENTS

Figure 1:
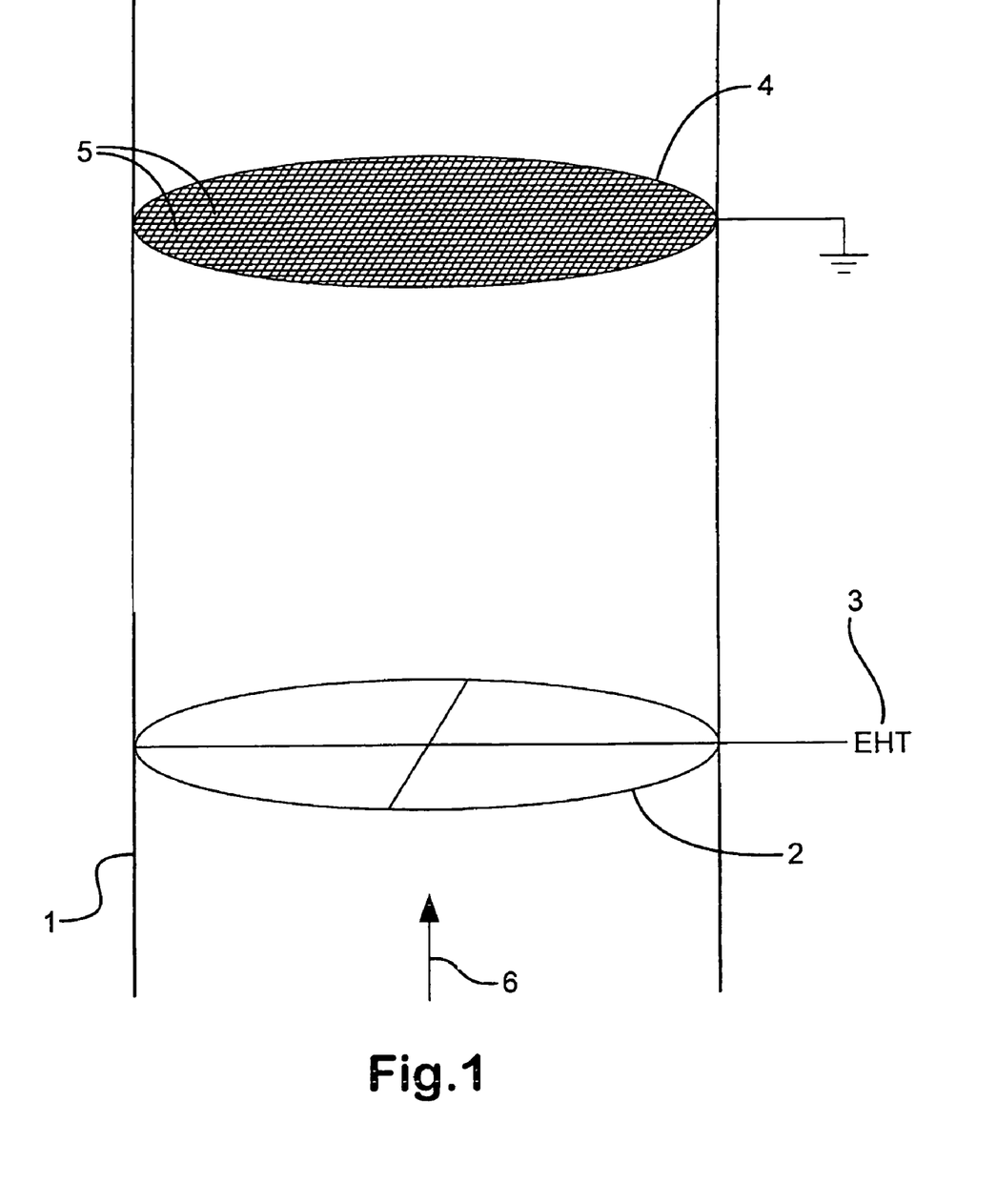
FIG. 1 shows an electromechanical filtering unit arrangement.

FIG. 1 shows an electromechanical filtering unit comprising a conduit (1) capable of conducting electricity, a first electrode (2) connected to a high voltage power supply (EHT) (3) and a second electrode (4) having a plurality of discrete openings (5). The second electrode is connected to the earth. The first electrode (2) is positioned upstream of the second electrode (4) with respect to the directional flow of the suspension (6).

Figure 2:
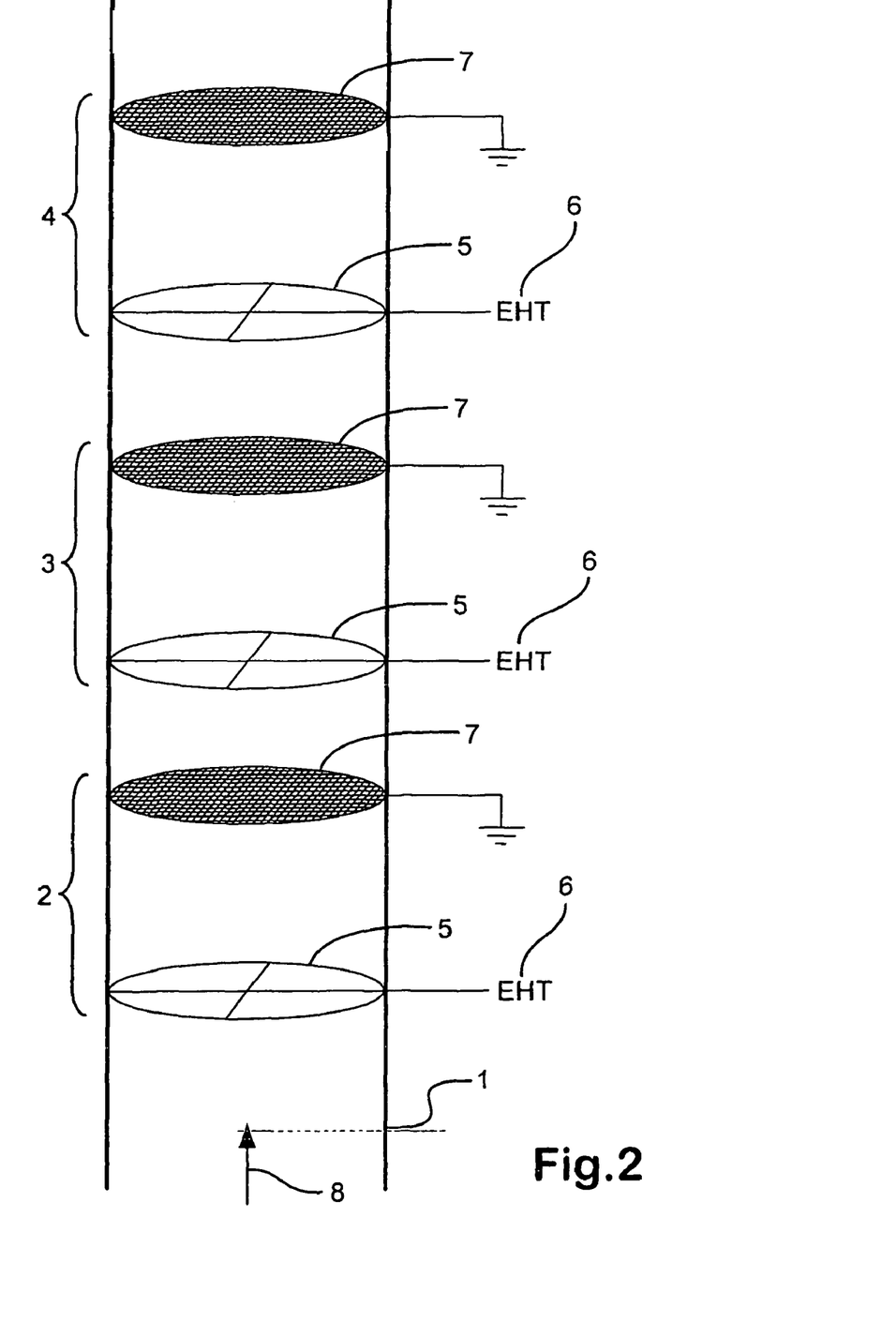
FIG. 2 shows an alternative electromechanical filtering unit arrangement.

FIG. 2 shows an electromechanical filtering unit comprising a conduit (1) capable of conducting electricity and a first electrode pair (2), a second electrode pair (3) and a third electrode pair (4) arranged in series within the conduit. Each electrode pair comprises a first electrode (5) connected to a high voltage power supply (EHT) (6) and a second electrode (7) each having a plurality of discrete openings. The second electrode of each electrode pair is connected to the earth.

The first electrode pair (2) is positioned upstream of the second electrode pair (3) with respect to the directional flow of the suspension (8) and the second electrode pair (3) is positioned upstream of the third electrode pair (4) with respect to the directional flow of the suspension (8).

The electric field generated between the first and second electrode of the first electrode pair (2) is less than that generated between the first and second electrode of the second electrode pair (3) and the electric field generated between the first and second electrode of the second electrode pair (3) is less than that generated between the first and second electrode of the third electrode pair (4).

FIG. 3 shows a first electromechanical filtering unit (1) comprising a first associated liquid holding vessel (2) and a second electromechanical filtering unit (3) connected to a second associated liquid holding vessel (4). A Fischer-Tropsch process providing a product suspension is passed into line (5). The product suspension is passed via line (5) and isolation valve V1 to the first electromechanical filtering unit (1) and to the second electromechanical filtering unit (2) via isolation valve V4. The product suspension is reduced in catalyst concentration to provide a liquid product with a reduced catalyst content which is passed to from the first electromechanical filtering unit (1) to the first liquid holding vessel (2) via isolation valve V2 and from the second electromechanical filtering unit (3) to the second liquid holding vessel (4) via isolation valve V3.

The product suspension reduced in catalyst concentration may then be passed from the holding vessels (2) and (3) via isolation valves V5 and V6 to be further treated e.g. by conventional filtration. Any gas retained within the product suspension reduced in catalyst concentration may exit holding vessels (2) and (3) via vent lines (6) and (7).

Figure 4:
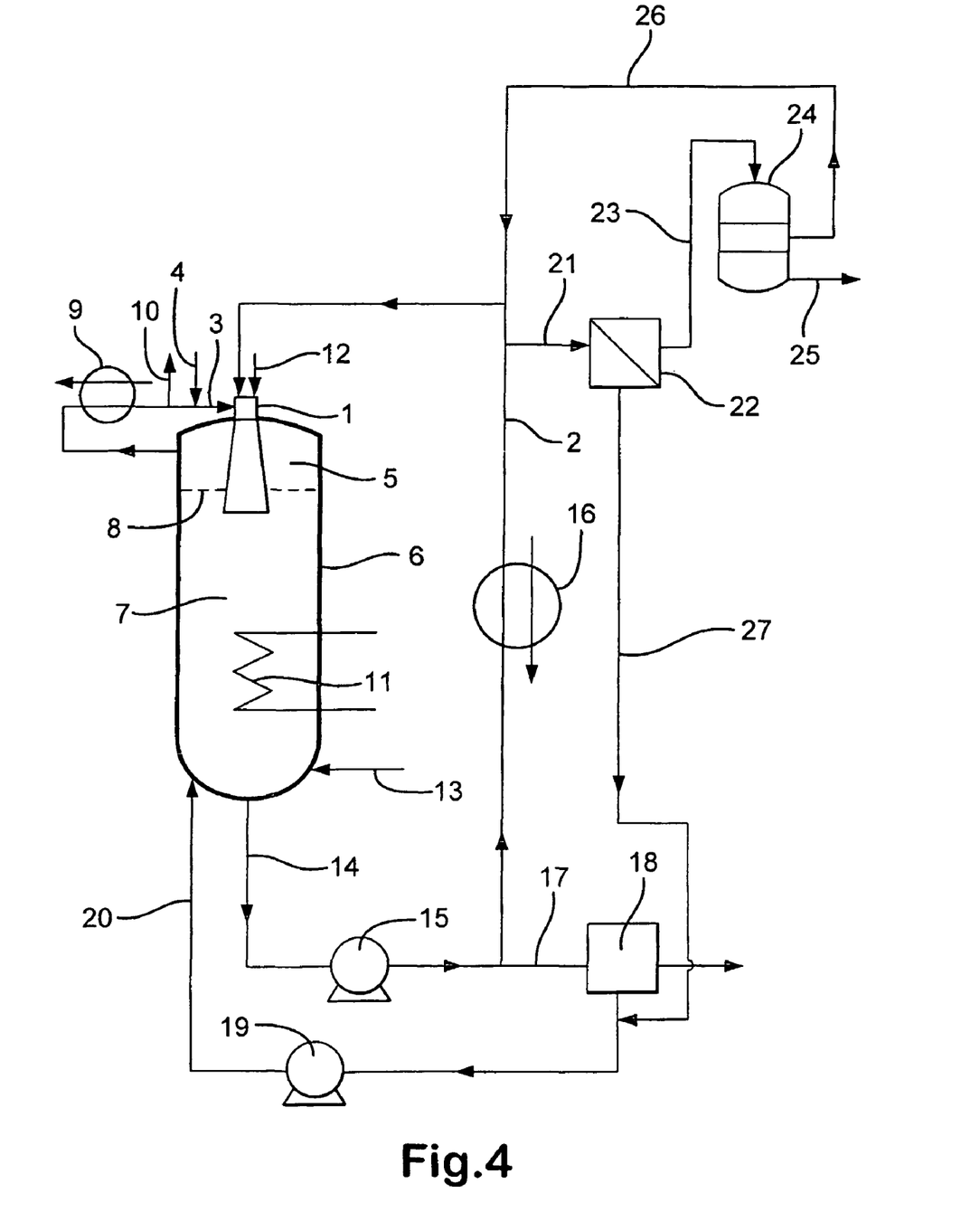
FIG. 4 shows a Fischer-Tropsch reactor.

FIG. 4 shows a Fischer-Tropsch reactor comprising an electromechanical filtering unit. A suspension of a catalyst in a liquid medium is recycled to an injector-mixing nozzle (1) via a line (2). Through one or more openings in the side wall of the injector-mixing nozzle (1) the suspension draws in a gaseous reactant stream comprising carbon monoxide and hydrogen, which is introduced into the injector-mixing nozzle (1) via a line (3). Fresh gaseous reactants are introduced via a line (4) into the line (3) through which unconverted gaseous reactants are recycled from a gas cap (5) which is present in the upper part of a vessel (6) the lower part of which contains a suspension (7) of the catalyst in a mixture of the liquid medium and liquid hydrocarbon products. A dotted line (8) in the Figure denotes the upper level of the suspension (7) in the vessel (6).

By means of cooling in a heat exchanger (9) the gas mixture passing through the line (3) is maintained at the correct operating temperature. Suitably, the heat exchanger (9) is a condenser having a water trap for removing water by-product from the system. A purge stream (10) is taken from the line (3) to prevent the build up of gaseous by-products in the gas cap (5). Optionally, a heat exchanger (11) e.g. cooling tubes is provided below the level of the suspension (7) in the vessel (6) to assist in removing the exothermic heat of reaction.

Optionally, a stream of low boiling hydrocarbon liquid(s) (low boiling solvent) may be introduced to the injector-mixing nozzle (1) via line (12) or alternatively to the vessel (6), via line (13). Where low boiling hydrocarbon liquid(s) are introduced to the system these may condense in the heat exchanger (9). The condensed low boiling hydrocarbon liquid(s) may be separated from the condensed water by-product in a decanter (not shown). The separated low boiling hydrocarbon liquid(s) may then be recycled to the system.

Via a lower outlet opening of the injector-mixing nozzle (1) the mixture of catalyst, liquid medium, liquid hydrocarbon products and unconverted gaseous reactants pass into the vessel (6) below the level (8) of the suspension (7). The unconverted gaseous reactants then separate into the gas cap (5).

Via a line (14) the suspension (7) is withdrawn from the bottom of the vessel (6) and at least a portion of the suspension is recycled to the injector-mixing nozzle (1) by means of pump (15) and the line (2). By means of cooling in a heat exchanger (16) the recycled suspension in the line (2) is maintained at the correct operating temperature.

Via a line (17) a portion of the suspension (7) is withdrawn and passed to an electromechanical filtering unit (18). Separated catalyst may be returned to the vessel (6) as a slurry via a slurry pump (19) and a line (20). The separated liquid medium and liquid hydrocarbon products may be passed from the electromechanical filtering unit (18) to a purification zone (not shown).

A portion of suspension may be withdrawn from line (2) and may be passed along line (21) to a separation means (22) where the liquid components of the suspension are separated from the catalyst (e.g., as described above). The separated liquids are then passed along line (23) to a decanter (24) where water by-product is removed from the system via line (25). The remaining liquids are then reintroduced into line (2) via line (26). The separated catalyst, from decanter (24), is introduced as a slurry into line (20) via a line (27).

FIG. 5 shows a first electromechanical filtering unit (1) comprising a first associated liquid holding vessel (2) and a second electromechanical filtering unit (3) connected to a second associated liquid holding vessel (4). A Fischer-Tropsch process providing a product suspension is passed into line (5). The product suspension is passed via line (5) and isolation valve V1 to the first electromechanical filtering unit (1) and to the second electromechanical filtering unit (2) via isolation valve V4. The product suspension is reduced in catalyst concentration to provide a liquid product with a reduced catalyst content which is passed to from the first electromechanical filtering unit (1) to the first liquid holding vessel (2) via isolation valve V2 and from the second electromechanical filtering unit (3) to the second liquid holding vessel (4) via isolation valve V3.

The product suspension reduced in catalyst concentration may then be passed from the holding vessels (2) and (3) via isolation valves V5 and V6 to be further treated e.g. by conventional filtration. Any gas retained within the product suspension reduced in catalyst concentration may exit holding vessels (2) and (3) via vent lines (6) and (7).

FIG. 5 further shows two different ways of recycling the separated catalyst to the FT reactor. As already indicated in the description, these two ways are respectively
1. to inject the recycle into the FT reaction zone—in which case it is preferred to use a pump in order to overcome the pressure difference—, or
2. to inject it directly into the high shear mixing zone when using the process described in WO0138269, the content of which being incorporated herein by reference.—in which case it is not necessary to use a recycle pump because there is the credit of the suction power of the high shear mixing zone (e.g. the injector mixing nozzle).

The invention claimed is:

1. Filtering process using an electromechanical filtering unit comprising a conduit capable of conducting electricity, at least one first electrode connectable to a high voltage power supply (EHT) and at least one second electrode having a plurality of discrete openings which is earthed wherein the electrodes are positioned within the conduit and connected to the conduit such that electricity can pass between the electrodes via the conduit, for removing solid catalyst particles suspended in a hydrocarbon liquid, said process comprising;
   a. passing the suspension through the conduit in a direction such that the first electrode is upstream of the second electrode with respect to the directional flow of the suspension,
   b. generating an electric field within the conduit by connecting the first electrode to the high voltage supply,
   such that the solid catalyst particles attach themselves to the second electrode and a hydrocarbon liquid with a reduced solids content passes through the conduit.

2. A filtering process according to claim 1, wherein in the electromechanical filtering unit the second electrode occupies the internal cross sectional area of the conduit.

3. A filtering process according to claim 1, wherein in the electromechanical filtering unit the first electrode occupies the internal cross sectional area of the conduit.

4. A filtering process according to claim 1, wherein the solid catalyst particles are Fischer-Tropsch catalyst particles and the hydrocarbon liquid is a Fischer-Tropsch product stream.

5. A filtering process according to claim 1, wherein the electromechanical filtering unit the conduit is cylindrical.

6. A filtering process according to claim 1, wherein in the electromechanical filtering unit the electrodes occupies almost substantially all the internal cross sectional area of the conduit.

7. A filtering process according to claim 1, wherein the electromechanical filtering unit comprises at least two pair of 2 electrodes in series.

8. A filtering process according to claim 4, wherein the solid catalyst particles are Fischer-Tropsch catalysts comprising at least one element selected from iron, cobalt and ruthenium.

* * * * *